United States Patent
Barsness et al.

(10) Patent No.: US 7,720,824 B2
(45) Date of Patent: May 18, 2010

(54) DATABASE RANGE CONSTRAINT THAT IS DYNAMICALLY LIMITED BY DATA IN THE DATABASE

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1332 days.

(21) Appl. No.: 10/733,752

(22) Filed: Dec. 11, 2003

(65) Prior Publication Data

US 2005/0131913 A1   Jun. 16, 2005

(51) Int. Cl.
*G06F 17/00* (2006.01)
(52) U.S. Cl. ...................... 707/694; 707/700
(58) Field of Classification Search .............. 707/100, 707/200
See application file for complete search history.

(56) References Cited

U.S. PATENT DOCUMENTS

| | | | | |
|---|---|---|---|---|
| 5,680,614 | A * | 10/1997 | Bakuya et al. | 707/103 R |
| 6,351,742 | B1 * | 2/2002 | Agarwal et al. | 707/3 |
| 6,463,429 | B1 * | 10/2002 | Geppert et al. | 707/3 |
| 2003/0084025 | A1 * | 5/2003 | Zuzarte | 707/2 |
| 2005/0198048 | A1 | 9/2005 | Barsness et al. | |

OTHER PUBLICATIONS

"Constraints and Triggers", pp. 1-3, http://www.cs.toronto.edu/db/courses/db2/constraints.html.

* cited by examiner

*Primary Examiner*—Wilson Lee
*Assistant Examiner*—Michael Le
(74) *Attorney, Agent, or Firm*—Martin & Associates, LLC; Derek P. Martin (57) ABSTRACT

A dynamic range constraint is defined that has one or more limits that are computed from data residing in the database. In a first embodiment, a dynamic range constraint is defined for a database column that includes at least one limit that is computed from data within that column. In a second embodiment, a dynamic range constraint is defined for a database column that includes at least one limit that is computed from data in a different database column. The limits may be computed using any suitable heuristic or criteria, including statistical analysis of the data in the database. In this manner a range constraint for a column may evolve automatically as the data in the database changes.

41 Claims, 6 Drawing Sheets

FIG. 1

| Table T | C1 | C2 | C3 | C4 |
|---|---|---|---|---|
| | Part No. | Supplier | Price | Quantity |
| 1 | 02-0493 | GOF | 12.45 | 3 |
| 2 | 09-6798 | WSX | 4.59 | 74 |
| 3 | 07-1158 | STC | 7.92 | 10 |
| ... | ... | ... | ... | ... |
| N-1 | 05-2229 | LAR | 8.55 | 123 |
| N | 03-7691 | FCJ | 2.71 | 46 |

FIG. 4  Prior Art $0.1*(\text{MEAN C3}) < C3 < 2.5*(\text{MEAN C3})$

FIG. 5

If $(\text{MEAN C3}) = 10.00$,
$1.00 < C3 < 25.00$

FIG. 6

If $(\text{MEAN C3}) = 15.00$,
$1.50 < C3 < 37.50$

FIG. 7

$0 < C4 < 2*(\text{MAX C4})$

FIG. 8

If $(\text{MAX C4}) = 150.00$,
$0 < C4 < 300$

FIG. 9

If $(\text{MAX C4}) = 565$,
$0 < C4 < 1{,}130$

Table S

| | C1 | C2 | C3 | C4 | C5 |
|---|---|---|---|---|---|
| | Part No. | Supplier | Price | Cost | Quantity |
| 1 | 02-0493 | GOF | 12.45 | 8.23 | 3 |
| 2 | 09-6798 | WSX | 4.59 | 2.68 | 74 |
| 3 | 07-1158 | STC | 7.92 | 5.14 | 10 |
| N-1 | 05-2229 | LAR | 8.55 | 6.02 | 123 |
| N | 03-7691 | FCJ | 2.71 | 1.85 | 46 |

FIG. 12

0 < C4 < (MAX C3)

FIG. 13

If (MAX C3) = 18.45,
0 < C4 < 18.45

FIG. 14

If (MAX C3) = 78.20,
0 < C4 < 78.20

DATABASE RANGE CONSTRAINT THAT IS DYNAMICALLY LIMITED BY DATA IN THE DATABASE

BACKGROUND OF THE INVENTION

1. Technical Field

This invention generally relates to computer systems, and more specifically relates to database constraints.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Database constraints are known in the art, and are used to limit data that may be entered into a database column. For example, a range constraint for a column that includes the age of people may have a range constraint that limits the entries to integer values from 1 to 99. If someone tries to enter a negative number, or zero, or 110, the database manager will detect that the data specified for the age column does not satisfy the limits specified in the range constraint for the age column. In this manner, data may be limited to expected ranges.

Known range constraints are static. Fixed numerical limits are selected (e.g., 1-99 in the example above). If the numerical limits for a range constraint need to be changed later on, the database administrator will have to manually change the limits as required. In many database systems, the natural evolution of the database requires manual adjustment of the fixed numerical limits for range constraints. For example, if a database table specifies a price range today, that same price range will likely need to be higher ten years from now, or even next year. Without a way for limits of range constraints to be adjusted based on data in the database table, the computer industry will continue to suffer the high overhead of having a database administrator change each fixed limit for range constraints that needs to be changed.

DISCLOSURE OF INVENTION

According to the preferred embodiments, a dynamic range constraint is defined that has one or more limits that are computed from data residing in the database. In a first embodiment, a dynamic range constraint is defined for a database column that includes at least one limit that is computed from data within that column. In a second embodiment, a dynamic range constraint is defined for a database column that includes at least one limit that is computed from data in a different database column. The limits may be computed using any suitable heuristic or criteria, including statistical analysis of the data in the database. In this manner a range constraint for a column may evolve automatically as the data in the database changes.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments define a dynamic range constraint that has one or more limits defined by data in the database. In a first embodiment, a dynamic range constraint for a database column has one or more limits defined by data within the column. In a second embodiment, a dynamic range constraint for a database column has one or more limits defined by data in a different database column. The limits for the dynamic range constraints of the preferred embodiments may be computed using any suitable heuristic, including statistical analysis of the data. Detailed examples in accordance with the preferred embodiments are presented below.

Figure 1:
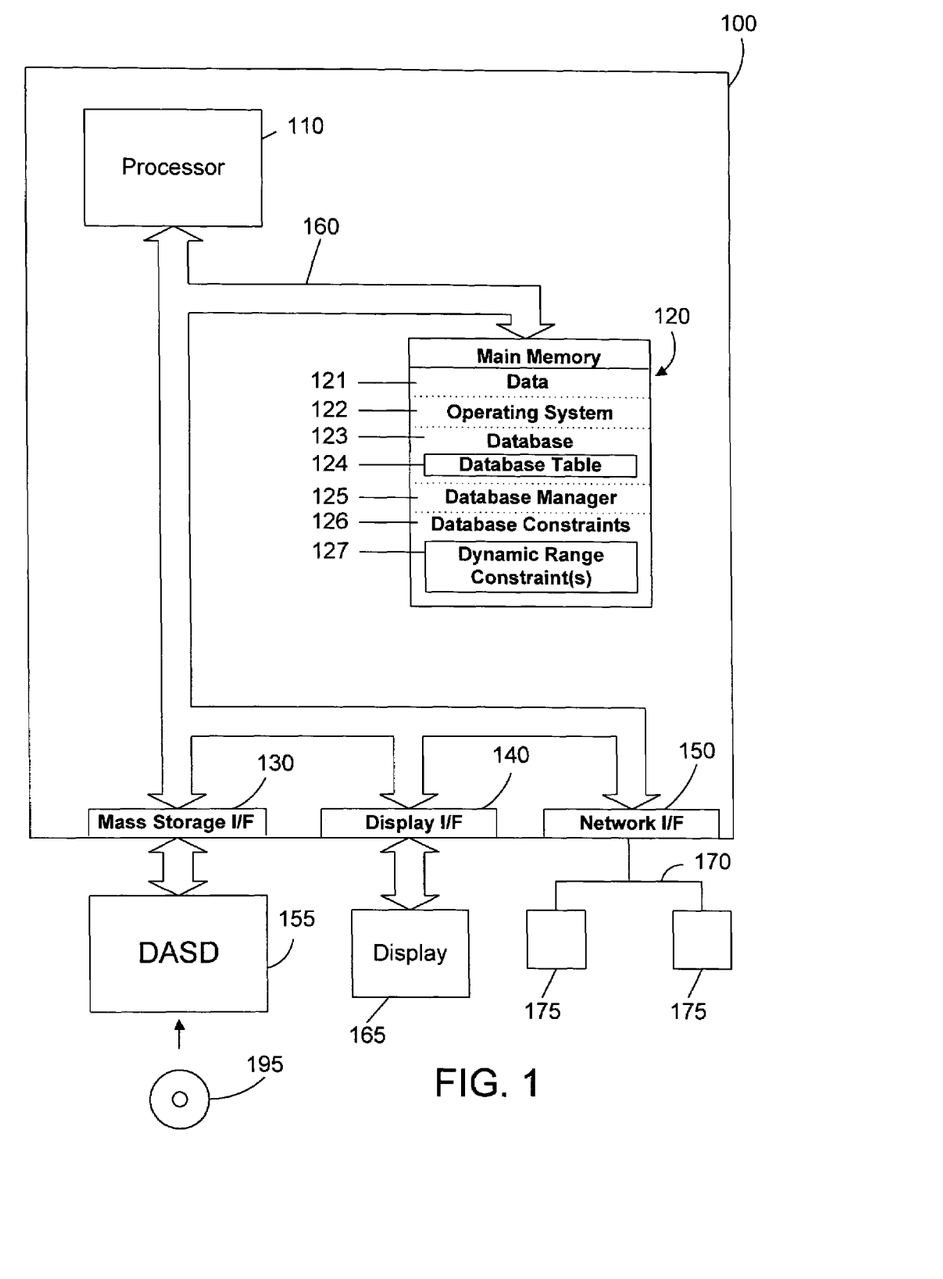
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 125, and database constraints 126. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more database tables 124. Each database table 124 preferably includes data organized in columns and rows, with each row in the database table 124 defining an entry (or record) in the corresponding database table 124. Database manager 125 provides an interface to database 123 that allows reading data from and writing data to the database table(s) 124. Database constraints 126 include known database constraints, such as primary key constraints, unique constraints, foreign key constraints, and check constraints, which include range constraints. Note, however, that database constraints 126 additionally include dynamic range constraints 127 in accordance with the preferred embodiments. The dynamic range constraints 127 are dynamic in the sense that they must determine one or more of their limits by analyzing data in the database. By providing limits for the dynamic range constraints 127 that are a function of data in the database, the dynamic range constraints 127 naturally and automatically evolve as the data in the database changes. For this reason, the dynamic range constraints 127 avoid making the system administrator manually change the fixed limits of prior art range constraints when a value does not lie within the range defined by the fixed limits.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 125, and database constraints 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 2:
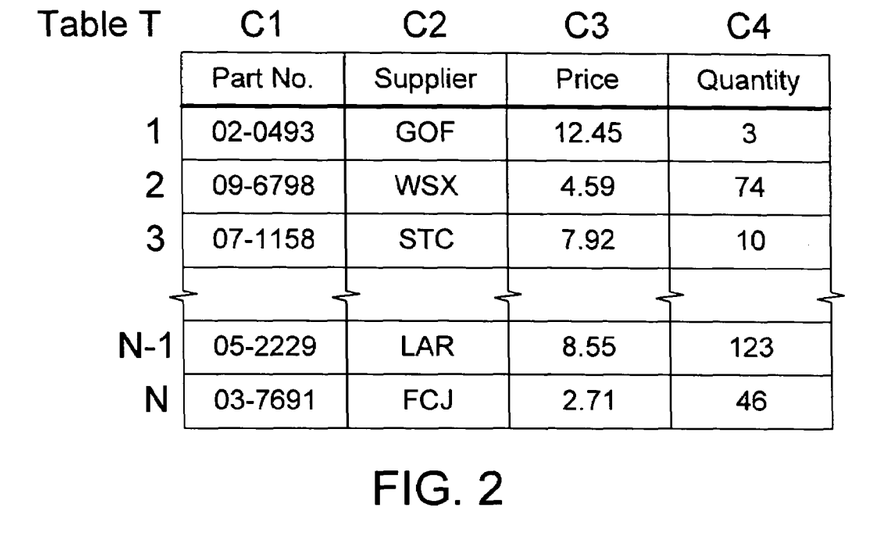
FIG. 2 shows a sample database table for illustrating the concepts of the prior art and the first embodiment.

Referring to FIG. 2, a sample database table T is used to illustrate the concepts of the prior art and of the first embodiment of the present invention. Table T includes four columns C1-C4, and N rows, as shown. We assume for this simple example that column C1 contains a part number, column C2 contains a three letter code that identifies the supplier of the part, column C3 contains the price for the part, and column C4 contains the quantity on-hand of the part.

Figure 3:
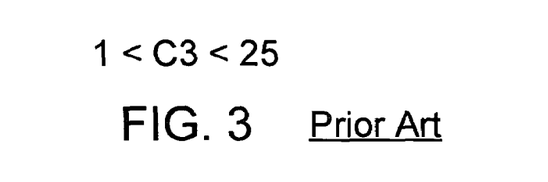
FIG. 3 shows a sample prior art range constraint for column C3 in the table of FIG. 2.

With table T as shown in FIG. 2, a prior art range constraint could be defined as shown in FIG. 3 that specifies a range for values in price column C3 between 1 and 25. This range constraint will prevent data outside of the range from 1-25 from being entered into the price column C3 in table T. The database manager that handles insertion of data into table T will enforce the range constraint limits to keep the data in the column within the specified range.

Figure 4:
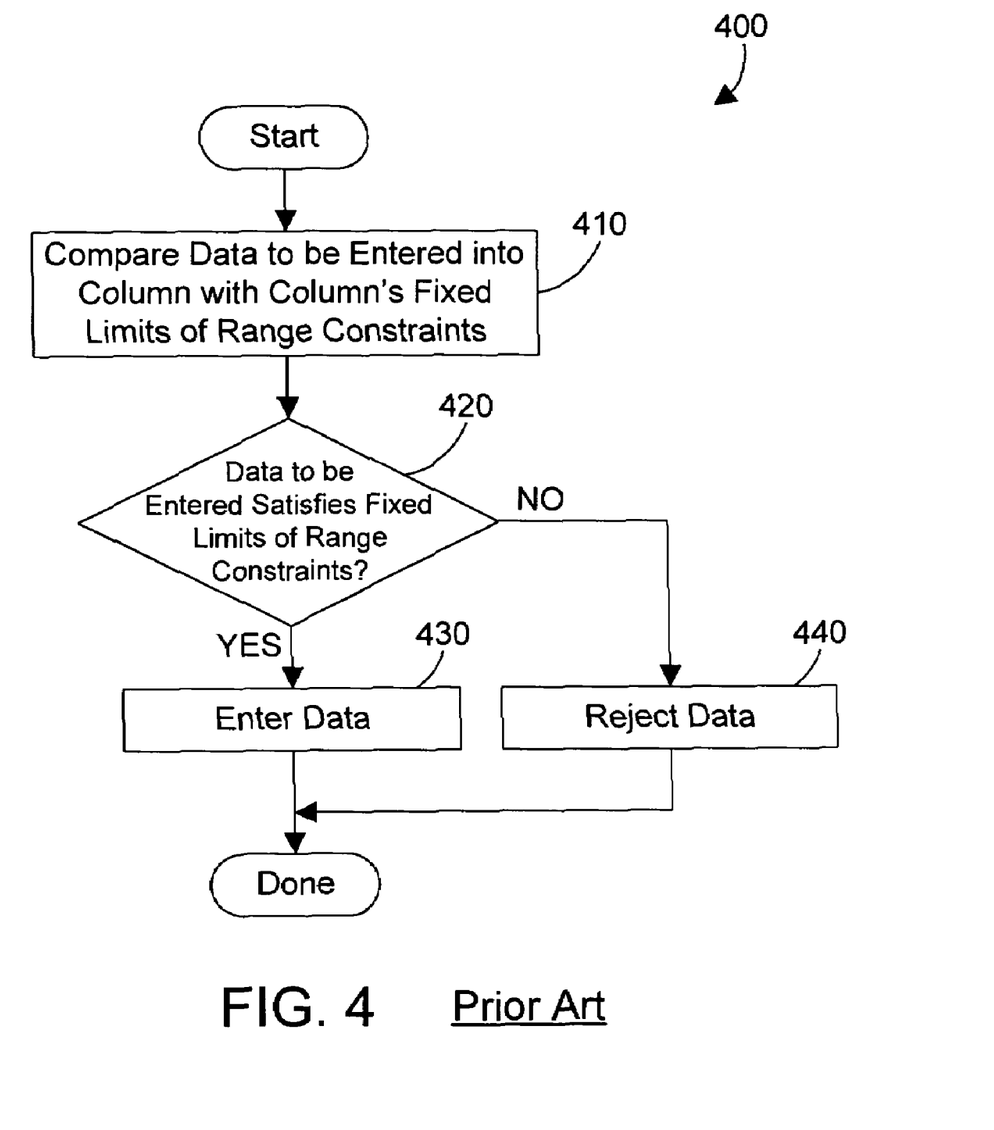
FIG. 4 is a flow diagram of a prior art method for entering data into a column that includes a range constraint.

Referring to FIG. 4, a prior art method 400 represents steps performed by a database manager once the prior art range constraint in FIG. 3 has been defined. Method 400 begins when data needs to be entered into a column that has a range constraint with fixed limits (as shown in FIG. 3). First, data to be entered into the column is compared with the fixed limits of the range constraint (step 410). Thus, for the specific example in FIG. 3, step 410 determines whether the data to be entered is between 1 and 25. If the data to be entered satisfies the fixed limits of the range constraint (step 420=YES), the data is entered into the column (step 430). If the data to be entered does not satisfy the fixed limits of the range constraint (step 420=NO), the data to be entered is rejected (step 440). In this manner, prior art method 400 limits the values of data that may be written to a database column by restricting data entry to data values that satisfy the fixed limits of the range constraint in FIG. 3.

The prior art range constraint, an example of which is shown in FIG. 3, includes only fixed numerical limits. Nowhere does the prior art teach a limit for a range constraint that may be dynamically determined. The preferred embodiments define a dynamic range constraint that includes one or more limits that may be dynamically determined from data in the database. In a first embodiment, a dynamic range constraint is defined for a selected column with one or more limits that are computed by analyzing data in the selected column. In a second embodiment, a dynamic range constraint is defined for a selected column with one or more limits that are computed by analyzing data in a column that is different than the selected column. In both cases, the database manager analyzes data in a database to dynamically determine limits for the dynamic range constraints.

Figure 5:
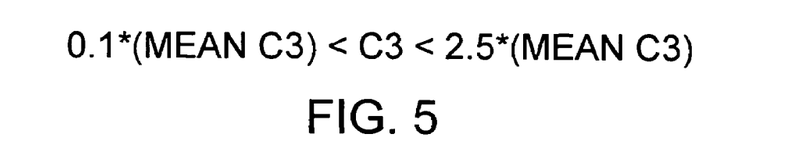
FIG. 5 shows a first dynamic range constraint in accordance with the first embodiment that has two limits defined by performing a computation over the data in the database column.
Figure 6:
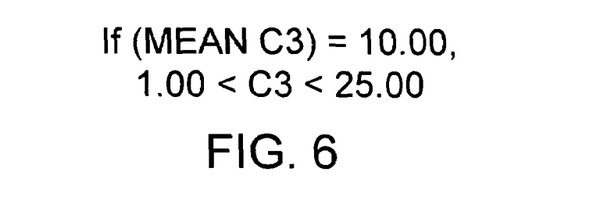
FIG. 6 shows the computed limits for the range constraint in FIG. 5 assuming a given mean for the column C3.
Figure 7:
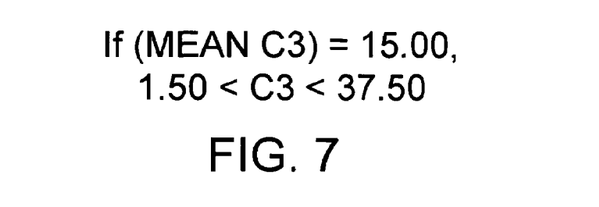
FIG. 7 shows the computed limits for the range constraint in FIG. 5 assuming a different mean for the column C3.

FIG. 5 shows one example of a dynamic range constraint within the scope of the first embodiment. The dynamic range constraint in FIG. 5 specifies that the value of column C3 must be between a lower limit that is 10% of the MEAN of column C3 and an upper limit that is 2.5 times the MEAN of column C3. We see from this example that the dynamic range constraint in FIG. 5 includes two limits that are dynamically determined from data in the database. Referring to FIG. 6, if the MEAN (or average) of column C3 in table T of FIG. 2 is 10.00, the range constraint in FIG. 5 will have computed limits of 1.00 and 25.00, resulting in the same limits shown in the prior art range constraint in FIG. 3. Note, however, that the limits for the dynamic range constraint in FIG. 5 will adjust as the MEAN of column C3 changes. If the mean of column C3 is 15.00, as shown in FIG. 7, the computed limits for the dynamic range constraint are 1.50 and 37.50, as shown in FIG. 7. By making one or more range constraint limits a function of data in the database table, the dynamic range constraint will naturally and automatically evolve and change according to the values stored in the database. Thus, as the prices of parts increases, the ranges of allowable prices will automatically shift to reflect the increase in the mean price in the column.

Figure 8:
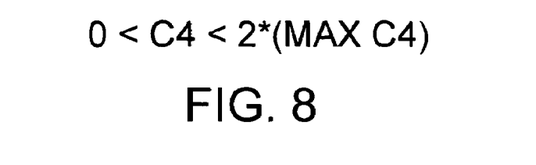
FIG. 8 shows a second dynamic range constraint in accordance with the first embodiment that has one limit defined by performing a computation over the data in the database column.
Figure 9:
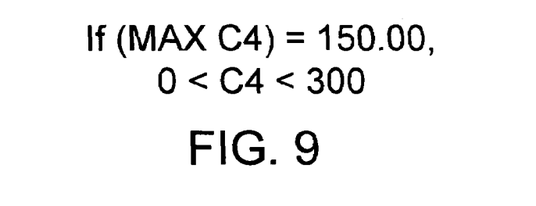
FIG. 9 shows the computed limits for the range constraint in FIG. 8 assuming a given maximum value in column C4.
Figure 10:
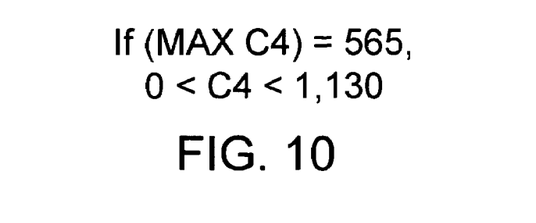
FIG. 10 shows the computed limits for the range constraint in FIG. 8 assuming a different maximum value in column C4.

Referring to FIG. 8, a second example of a dynamic range constraint within the scope of the first embodiment includes a single limit that is dynamically determined from data in the database. The dynamic range constraint of FIG. 8 specifies that the value of the quantity column C4 must be between zero and twice the maximum value in column C4. This type of range constraint prevents a gross error in quantity from being entered, such as adding an extra digit or entering a negative number. If the maximum quantity in the C4 column is 150, the computed range for C4 will be from 0 to 300, as shown in FIG. 9. In similar fashion, if the maximum quantity in the C4 column is 565, the computed range for C4 will be from 0 to 1,130, as shown in FIG. 10. The first embodiment thus allows defining a dynamic range constraint with one or more limits that are dynamically determined from data within the column on which the dynamic range constraint is defined.

Figure 11:
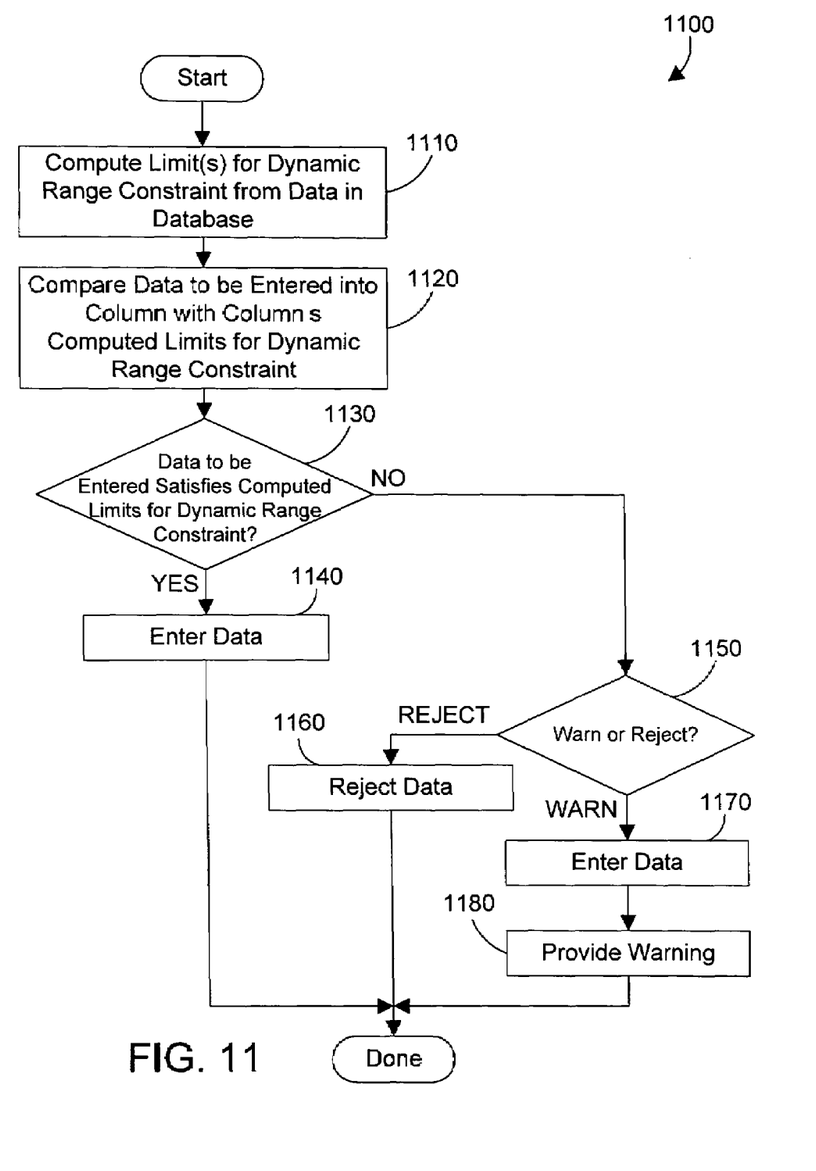
FIG. 11 is a flow diagram of a method in accordance with the preferred embodiments for entering data into a column that includes a dynamic range constraint of the preferred embodiments.
Figure 12:
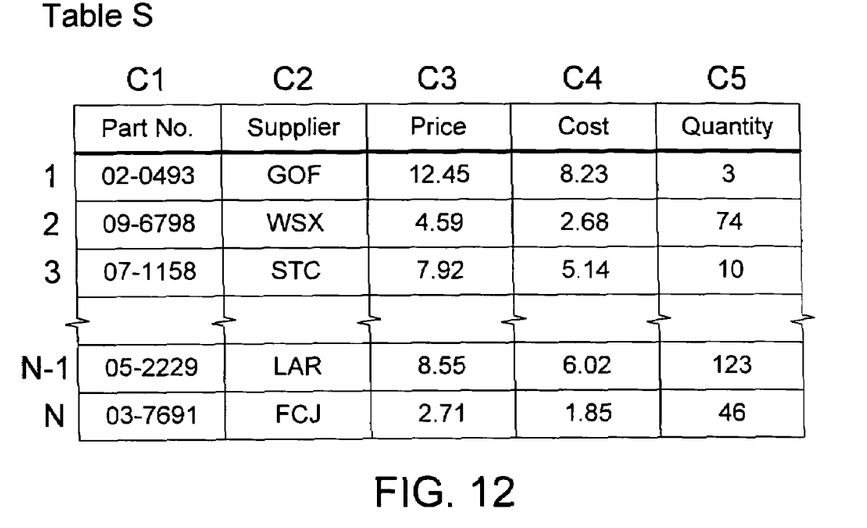
FIG. 12 is a sample database table for illustrating the concepts of the second embodiment.

Referring to FIG. 11, a method 1100 in accordance with the preferred embodiments is performed by a database manager once one or more dynamic range constraints (such as those shown in FIGS. 5 and 8) are defined. Method 1100 assumes that data needs to be entered into a column on which a dynamic range constraint of the present invention is defined. The first step is to compute one or more limits for the dynamic range constraint from the data in the database (step 1110). Next, the data to be entered into the column is compared with the column's computed limits for the dynamic range constraint (step 1120). If the data to be entered satisfies the computed limit(s) for the dynamic range constraint (step 1130), the data is entered (step 1140). If the data to be entered does not satisfy the computed limit(s) for the dynamic range constraint (step 1130=NO), the action taken depends on whether the dynamic range constraint was specified as a warning constraint or a rejection constraint. The present invention includes the concept of defining different types of dynamic range constraints. If the dynamic range constraint at issue in FIG. 11 is specified as a warning constraint (step 1150=WARN), the data is entered (step 1170), and a warning is provided (step 1180). The warning may take any suitable form, including a message to a database administrator, a return code to a program that entered the data, an e-mail to an appropriate person, etc. If the dynamic range constraint at issue in FIG. 11 is specified as a rejection constraint (step 1150=REJECT), the data is rejected (step 1160). The dynamic range constraints of the preferred embodiments thus give great flexibility in defining one or more limits that are computed from data in the database, and that may be specified as either warning constraints or rejection constraints.

Figure 13:
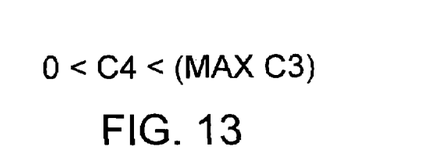
FIG. 13 shows a dynamic range constraint in accordance with the second embodiment that has one limit defined by performing a computation over the data in a different database column.
Figure 14:
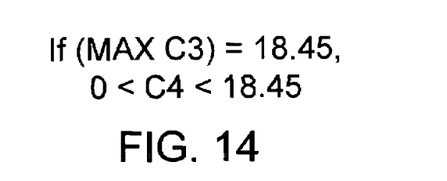
FIG. 14 shows the computed limits for the range constraint in FIG. 13 assuming a given maximum value in column C3.
Figure 15:
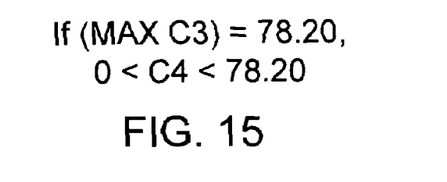
FIG. 15 shows the computed limits for the range constraint in FIG. 13 assuming a different maximum value in column C3.

A second embodiment of the present invention is presented using FIGS. 12-15. A sample database table S in FIG. 12 includes many of the columns and data shown in table T in FIG. 2, but additionally includes a cost column C4 that specifies the purchase price of the part represented by the part number from the supplier. We assume for this sample table S that the cost column C4 contains the cost paid to the supplier for the part, while the price column C3 contains the price charged to customers for the part. The difference between price and cost thus represents profit made from selling the part. The second embodiment differs from the first embodiment by allowing a dynamic range constraint to be defined on a first column that includes one or more limits that are computed from data in one or more other columns. Referring to FIG. 13, a dynamic range constraint in accordance with the second embodiment specifies a range for the cost column C4 that goes from zero to the maximum value in the price column C3. Assuming that parts are never sold below cost, the value in the cost column C4 should never exceed the maximum price in the price column C3. Referring to FIG. 14, if the maximum price in column C3 is $18.45, then the dynamic range constraint of FIG. 13 specifies a range for column C4 from zero to $18.45. If the maximum price in column C3 is $78.20, the dynamic range constraint of FIG. 13 specifies a range for column C4 from zero to $78.20. Thus, as the prices in the price column C3 rise, the maximum allowable cost for the cost column C4 goes up as well. In the specific example shown in FIGS. 12-15, the dynamic range constraint for a first column includes one or more limits that are a function of data in a second column in the same database table. Note, however, that the second embodiment expressly extends to defining a dynamic range constraint for a first column that includes one or more limits that are a function of data in one or more other columns, which may include column(s) in a different database table.

The specific examples shown in the figures illustrate some very simple and basic computations that could be performed on data in the database to compute one or more limits for a dynamic range constraint. Of course, more complex computations could be used based on any suitable heuristic that perform more sophisticated statistical or other complex analysis on the data in the database. Performing complex computations on every database operation that has a dynamic constraint would incur some processing overhead. To minimize this effect, dynamic constraints could be configured such that their limits are computed only at set times, such as hourly, daily, monthly, etc. The present invention expressly extends to any and all methods for dynamically computing a limit for a range constraint from data in the database, regardless of the simplicity or complexity of the computation.

The preferred embodiments provide range constraints that can grow and evolve as a database grows. Let's assume, for example, that a company that sells mail order items has a price range from $0.25 to $89.50 for all items in its catalog. A dynamic range constraint could be defined for the price column that includes limits determined from analysis of the price data in the price column. Now let's assume this company acquires another small mail order company that sells mail order items with a price range of $1.99 to $149.00. As the items for the new company are added to the database, the limits for the dynamic range constraints will automatically be adjusted to reflect the newly-added data. As a result, the dynamic range constraints of the preferred embodiments provide a way to define range constraints that will minimize the likelihood that a system administrator will have to re-defined the limits for the range constraints in the future.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a database residing in the memory;
   a range constraint defined for the database, the range constraint including at least one limit that is dynamically determined from data in the database; and
   a database manager residing in the memory and executed by the at least one processor, wherein the range constraint defines a range that includes the at least one limit, and wherein the database manager allows entry of data into the database when the data lies within the range.

2. The apparatus of claim 1 wherein the database comprises at least one database table comprising at least one column, and wherein the range constraint is defined for a selected column.

3. The apparatus of claim 2 wherein the at least one limit is dynamically determined from data in the selected column.

4. The apparatus of claim 2 wherein the at least one limit is dynamically determined from data in a column that is different than the selected column.

5. The apparatus of claim 1 wherein the at least one limit is dynamically determined by performing statistical analysis on data in the database.

6. The apparatus of claim 1 wherein the range constraint defines a range that includes the at least one limit, and wherein the database manager allows entry of data into the database when the data lies within the defined range and does not allow entry of data into the database when the data lies outside the defined range.

7. The apparatus of claim 1 wherein the range constraint defines a range that includes the at least one limit, and wherein:
   if the data lies within the defined range, the database manager allows entry of the data into the database; and
   if the data lies outside of the defined range, the database manager allows entry of the data into the database and provides a warning message.

8. An apparatus comprising:
   at least one processor;
   a memory coupled to the at least one processor;
   a database table residing in the memory, the database table including at least one column;
   a range constraint defined for a selected column in the database table, the range constraint defining a range that includes at least one limit that is dynamically determined from data in the selected column; and
   a database manager residing in the memory and executed by the at least one processor, the database manager allowing entry of data into the selected column when the data lies within the defined range.

9. The apparatus of claim 8 wherein the database manager allows entry of data into the selected column when the data lies within the defined range and does not allow entry of data into the database when the data lies outside the defined range.

10. The apparatus of claim 8 wherein the database manager allows entry of data into the selected column when the data lies outside the defined range and in response thereto, provides a warning message.

11. The apparatus of claim 8 wherein the at least one limit is dynamically determined by performing statistical analysis on data in the selected column.

12. An apparatus comprising:
   at least one processor;
   a memory coupled to the at least one processor;
   a database table residing in the memory, the database table including at least one column;
   a range constraint defined for a selected column in the database table, the range constraint defining a range that includes at least one limit that is dynamically determined from data in a column that is different than the selected column; and
   a database manager residing in the memory and executed by the at least one processor, the database manager allowing entry of data into the selected column when the data lies within the defined range.

13. The apparatus of claim 12 wherein the database manager allows entry of data into the selected column when the data lies within the defined range and does not allow entry of data into the selected column when the data lies outside the defined range.

14. The apparatus of claim 12 wherein the database manager allows entry of data into the selected column when the data lies outside the defined range and in response thereto, provides a warning message.

15. The apparatus of claim 12 wherein the at least one limit is dynamically determined by performing statistical analysis on data in the different column.

16. A computer-implemented method for entering data in a database, the method comprising the steps of:
  (A) defining a range constraint for a selected portion of the database;
  (B) defining at least one limit for the range constraint that is dynamically determined from data in the database; and
  (C) allowing entry of data into the selected portion of the database when the data lies within a range defined by the range constraint.

17. The method of claim 16 wherein the database comprises at least one table comprising at least one column, and wherein the selected portion comprises a selected column.

18. The method of claim 17 wherein step (B) defines at least one limit that is dynamically determined from data in the selected column.

19. The method of claim 17 wherein step (B) defines at least one limit that is dynamically determined from data in a column that is different than the selected column.

20. The method of claim 16 wherein step (B) defines at least one limit that is dynamically determined by performing statistical analysis on data in the database.

21. A computer-implemented method for limiting data entry into a selected column in a database table, the method comprising the steps of:
  (A) defining a range constraint for the selected column, the range constraint defining a range that includes at least one limit that is dynamically determined from data in the database table; and
  (B) allowing entry of data into the selected column only when the data to be entered lies within the defined range.

22. The method of claim 21 wherein step (A) defines at least one limit that is dynamically determined from data in the selected column.

23. The method of claim 21 wherein step (A) defines at least one limit that is dynamically determined from data in a column that is different than the selected column.

24. The method of claim 21 wherein step (A) defines at least one limit that is dynamically determined by performing statistical analysis on data in the database table.

25. A computer-implemented method for entering data into a selected column in a database table, the method comprising the steps of:
  (A) defining a range constraint for the selected column, the range constraint defining a range that includes at least one limit that is dynamically determined from data in the database table; and
  (B) if the data to be entered lies outside of the defined range, allowing entry of data into the selected column, and in response thereto, providing a warning message.

26. The method of claim 25 wherein step (A) defines at least one limit that is dynamically determined from data in the selected column.

27. The method of claim 25 wherein step (A) defines at least one limit that is dynamically determined from data in a column that is different than the selected column.

28. The method of claim 25 wherein step (A) defines at least one limit that is dynamically determined by performing statistical analysis on data in the database table.

29. A computer-readable program product comprising:
  (A) a database manager that allows defining a range constraint for a database, the range constraint including at least one limit that is dynamically determined from data in the database, the database manager allowing entry of data into the database when the data lies within a range defined by the range constraint; and
  (B) computer-readable recordable media bearing the database manager.

30. The program product of claim 29 wherein the database comprises at least one database table comprising at least one column, and wherein the range constraint is defined for a selected column.

31. The program product of claim 30 wherein the at least one limit is dynamically determined from data in the selected column.

32. The program product of claim 30 wherein the at least one limit is dynamically determined from data in a column that is different than the selected column.

33. The program product of claim 29 wherein the at least one limit is dynamically determined by performing statistical analysis on data in the database.

34. The program product of claim 29 wherein the range constraint defines a range that includes the at least one limit, and wherein the database manager allows entry of data into the database when the data lies within the defined range and does not allow entry of data into the database when the data lies outside the defined range.

35. The program product of claim 29 wherein the range constraint defines a range that includes the at least one limit, and wherein the database manager allows entry of data into the database and provides a warning message when the data lies outside the defined range.

36. A computer-readable program product comprising:
  (A) a database manager that allows defining a range constraint for a selected column in a database table, the range constraint defining a range that includes at least one limit that is dynamically determined from data in the selected column, the database manager allowing entry of data into the selected column when the data lies within the defined range; and
  (B) computer-readable recordable media bearing the database manager.

37. The program product of claim 36 wherein the database manager allows entry of data into the selected column when the data lies within the defined range and does not allow entry of data into the database when the data lies outside the defined range.

38. The program product of claim 36 wherein the database manager allows entry of data into the selected column and provides a warning message when the data lies outside the defined range.

39. A computer-readable program product comprising:
  (A) a database manager that allows defining a range constraint for a selected column in a database table, the range constraint defining a range that includes at least one limit that is dynamically determined from data in a column that is different than the selected column, the database manager allowing entry of data into the selected column when the data lies within the defined range; and
  (B) computer-readable recordable media bearing the database manager.

40. The program product of claim 39 wherein the database manager allows entry of data into the selected column when the data lies within the defined range and does not allow entry of data into the database when the data lies outside the defined range.

41. The program product of claim 39 wherein the database manager allows entry of data into the selected column and provides a warning message when the data lies outside the defined range.

* * * * *